United States Patent
Tseng et al.

(10) Patent No.: US 9,614,204 B2
(45) Date of Patent: Apr. 4, 2017

(54) BATTERY BOX STRUCTURE

(71) Applicant: Cheng Uei Precision Industry Co., Ltd., New Taipei (TW)

(72) Inventors: Chi Ming Tseng, New Taipei (TW); Chin Chung Lin, New Taipei (TW); Chia Fa Cheng, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 321 days.

(21) Appl. No.: 14/491,022

(22) Filed: Sep. 19, 2014

(65) Prior Publication Data

US 2016/0087255 A1 Mar. 24, 2016

(51) Int. Cl.
*H01M 2/10* (2006.01)

(52) U.S. Cl.
CPC ...... *H01M 2/1055* (2013.01); *H01M 2220/30* (2013.01)

(58) Field of Classification Search
CPC .................. H01M 2/1055; H01M 2220/30
See application file for complete search history.

(56) References Cited

U.S. PATENT DOCUMENTS

2013/0221923 A1* 8/2013 Robertson ........... H01M 2/1022
320/112

* cited by examiner

*Primary Examiner* — Sarah A Slifka
*Assistant Examiner* — Brian Ohara
(74) *Attorney, Agent, or Firm* — Muncy, Geissler, Olds & Lowe, P.C.

(57) ABSTRACT

A battery box structure includes an enclosure which defines a first receiving groove, a first circuit board, a push button elastically disposed between the enclosure and the first circuit board, and a battery holder. At least one pair of conductive terminals is fastened to the first circuit board. A tail end of each of the conductive terminals is arched downward to form a resilient contact portion. The battery holder includes at least one pair of conductive pads. A bottom end of the push button is buckled with a top end of the battery holder. The battery holder is assembled in the first receiving groove. Each of the conductive pads electrically contacts the resilient contact portion. When the push button is pressed rearward, the bottom end of the push button breaks away from the top end of the battery holder. The battery holder is automatically ejected out of the enclosure.

12 Claims, 12 Drawing Sheets

BATTERY BOX STRUCTURE

BACKGROUND OF THE INVENTION

1. Field of the Invention

The present invention generally relates to a battery box structure, and more particularly to a battery box structure for receiving at least one battery therein.

2. The Related Art

Referring to FIG. 12, a battery box structure 100' for receiving at least one battery 200' therein is disposed in an electronic product 300', such as a remote controller or a game controller. In FIG. 12, two batteries 200' are received in the battery box structure 100' to provide electric power for the electronic product 300'. A rear surface of the electronic product 300' is recessed inward to form a receiving groove 101'. The electronic product 300' further includes a cover portion 102' for covering the receiving groove 101'. The receiving groove 101' and the cover portion 102' together are defined as the battery box structure 100'. After the batteries 200' are placed in the receiving groove 101' of the battery box structure 100', the cover portion 102' is mounted in the receiving groove 101' to cover up the batteries 200', so that the batteries 200' are restrained in the receiving groove 101' for avoiding falling off at the time of the electronic product 300' being used.

When the batteries 200' placed in the battery box structure 100' need be replaced, the electronic product 300' is turned over at 180 degrees and the cover portion 102' is removed. After completing the replacement of the batteries 200', the cover portion 102' is mounted in the receiving groove 101' again to cover up the batteries 200'. Then the electronic product 300' is turned over at 180 degrees again to make the electronic product 300' be able to be used.

However, the foregoing process of replacing the batteries 200' placed in the battery box structure 100' need spend too much time. Moreover, the cover portion 102' is completely exposed outside, and the exposed area of the cover portion 102' is so large that dissatisfies an appearance requirement of the electronic product 300'.

So it's essential to provide an improved battery box structure which is adapted for being disposed in an electronic product, wherein the improved battery box structure is for the convenience of replacing the batteries therein.

SUMMARY OF THE INVENTION

An object of the present invention is to provide a battery box structure for receiving at least one battery therein. The battery box structure includes an enclosure, a first circuit board, a push button and a battery holder. The enclosure defines a first receiving groove which penetrates through a bottom surface and a lower portion of a front surface of the enclosure. The first circuit board is mounted inside the enclosure, and is located above the first receiving groove. At least one pair of conductive terminals is fastened to the first circuit board. A tail end of each of the conductive terminals is arched downward to form a resilient contact portion projecting into the first receiving groove. The push button is elastically disposed between the enclosure and the first circuit board. The push button is partially exposed outside the enclosure. The battery holder defines a holding groove which penetrates through a rear surface of the battery holder. The battery holder includes at least one pair of plate-shaped conductive pads fastened to a top of the battery holder. The battery is placed in the holding groove of the battery holder. A bottom end of the push button is buckled with a top end of the battery holder. The battery holder together with the battery is assembled upward in the first receiving groove of the enclosure. Each of the conductive pads is corresponding to and electrically contacts the resilient contact portion of one of the conductive terminals. The resilient contact portion of each of the conductive terminals is compressed to accumulate elastic force. The conductive pads are electrically connected with an anode and a cathode of the battery, respectively. When the push button is pressed rearward, the bottom end of the push button breaks away from the top end of the battery holder. The resilient contact portions of the conductive terminals release the elastic force to push against the conductive pads of the battery holder to make the battery holder move downward for a distance, so that the battery holder is automatically ejected out of the enclosure.

As described above, when the battery placed in the holding groove of the battery holder need be replaced, the push button is pressed rearward to accumulate elastic force, and the bottom end of the pressing portion breaks away from the top end of the battery holder, the resilient contact portions of the conductive terminals release the elastic force to push against the conductive pads of the battery holder to make the battery holder move downward for a distance, so that the battery holder is automatically ejected out of the first enclosure of the enclosure. As a result, the battery holder is taken down directly to replace the battery placed in the battery holder of the battery box structure, so that the process of replacing the battery placed in the battery box structure of the electronic product need spend less time. Moreover, a second enclosure of the enclosure is fastened to a front of a first enclosure of the enclosure and covers up a top of the first receiving groove, so the first receiving groove is partially exposed out of the second enclosure to make an area of the cover portion of the battery holder exposed out of the first receiving groove be smaller so as to satisfy an appearance requirement of the electronic product. Thus, the battery box structure is for the convenience of replacing the battery therein.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
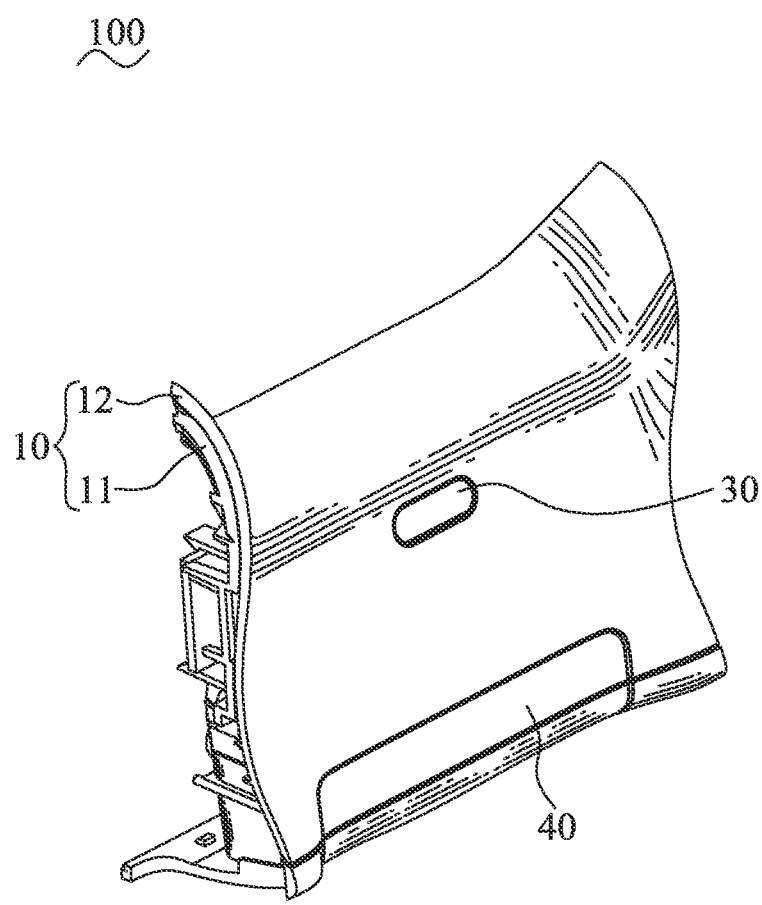
FIG. 1 is a perspective view of a battery box structure in accordance with an embodiment of the present invention.
Figure 3:
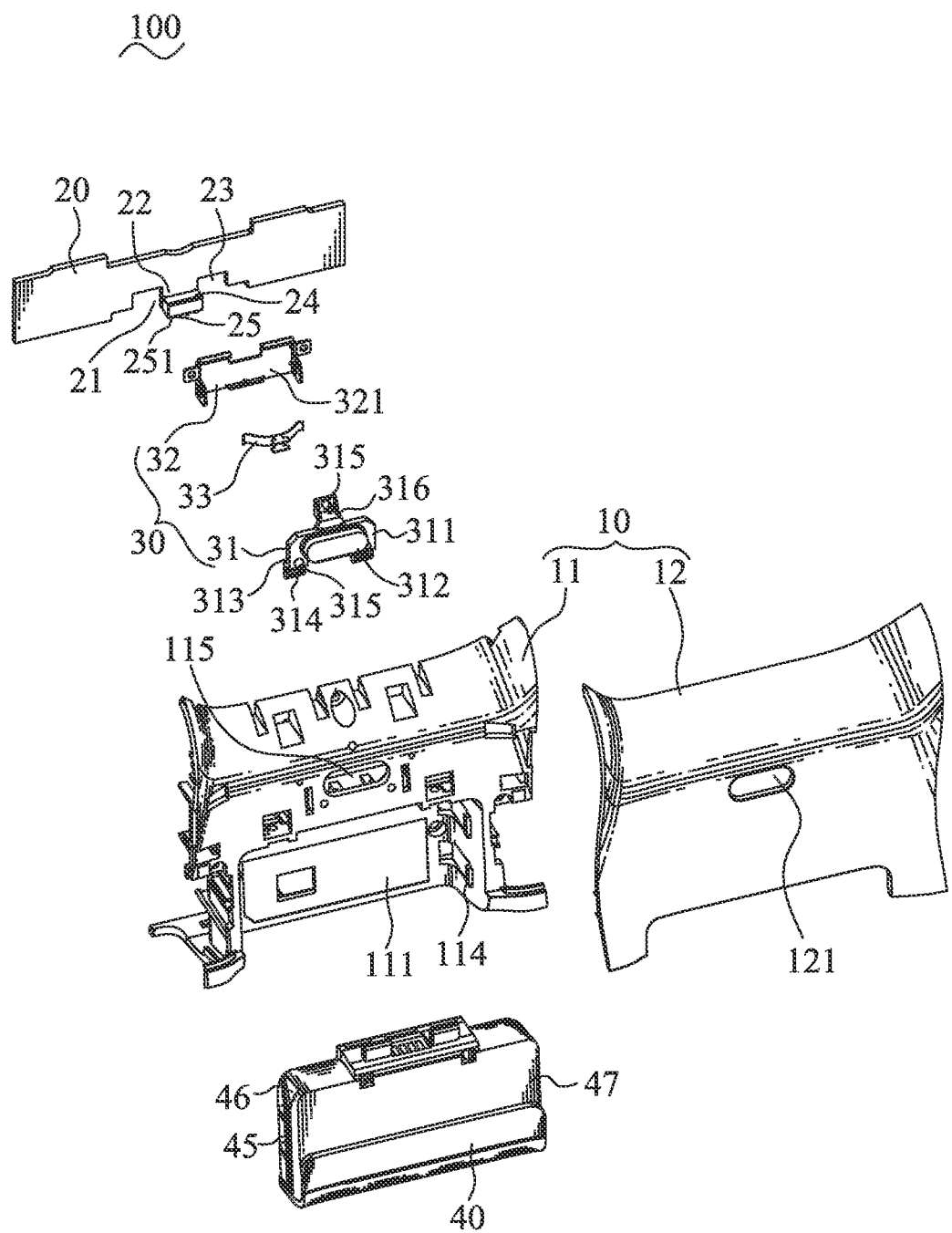
FIG. 3 is an exploded view of the battery box structure of FIG. 1.
Figure 4:
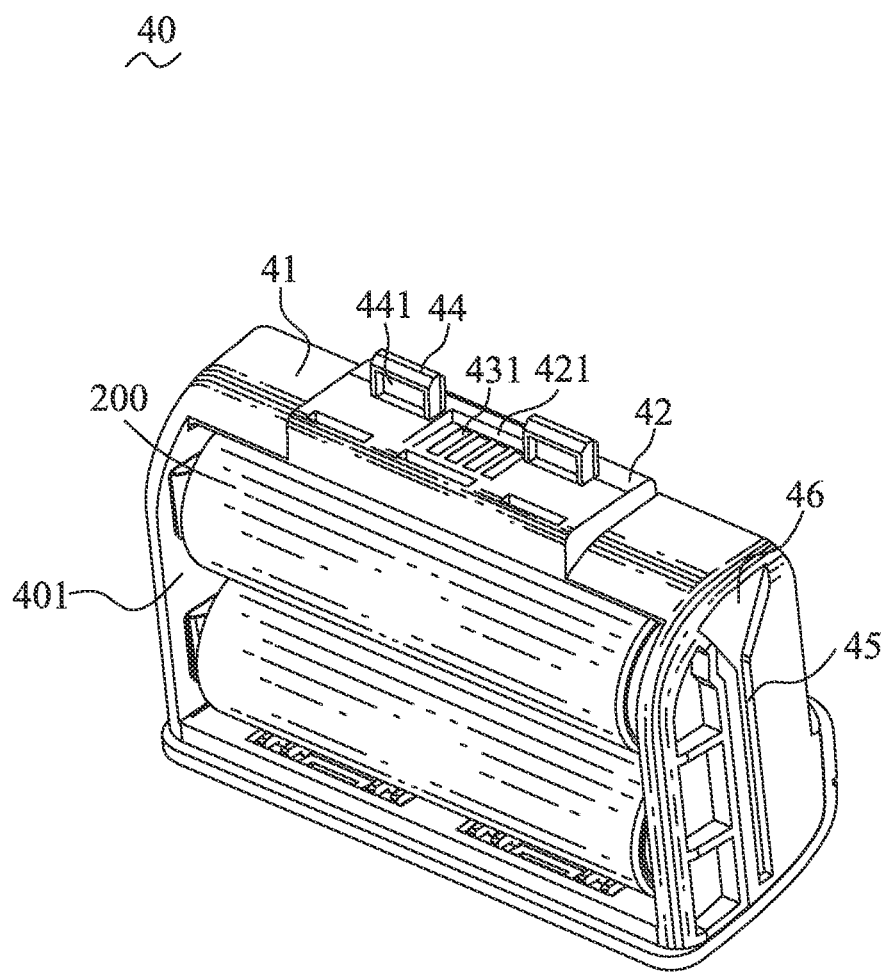
FIG. 4 is a perspective view of the battery holder of the battery box structure of FIG. 3, wherein at least one battery is placed in the battery holder.

Referring to FIG. 1, FIG. 3 and FIG. 4, a battery box structure 100 in accordance with an embodiment of the present invention is adapted for being disposed in an electronic product (not shown). Preferably, the electronic product is a game controller. The battery box structure 100 for receiving at least one battery 200 therein, includes an enclosure 10, a first circuit board 20, a push button 30 and a battery holder 40.

Figure 6:
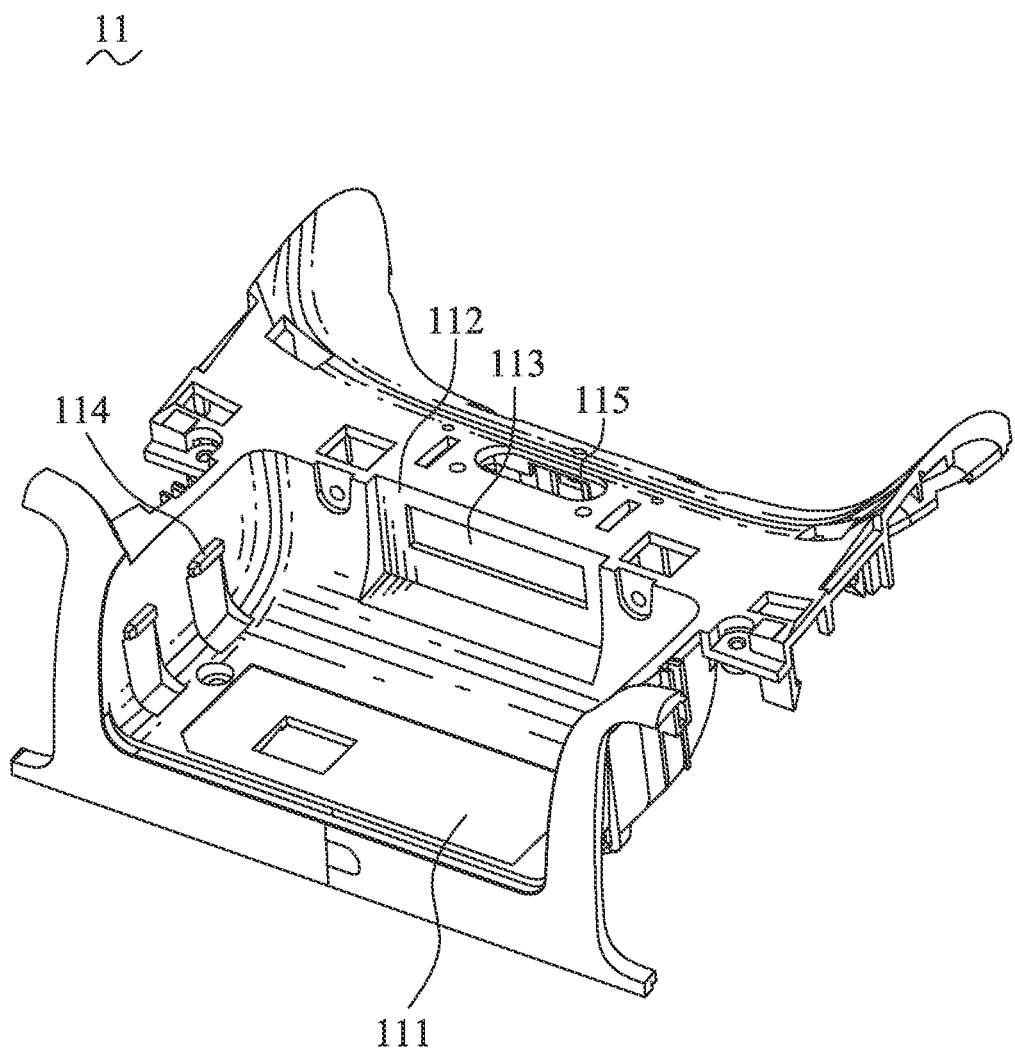
FIG. 6 is a perspective view of a first enclosure of the battery box structure of FIG. 3.
Figure 7:
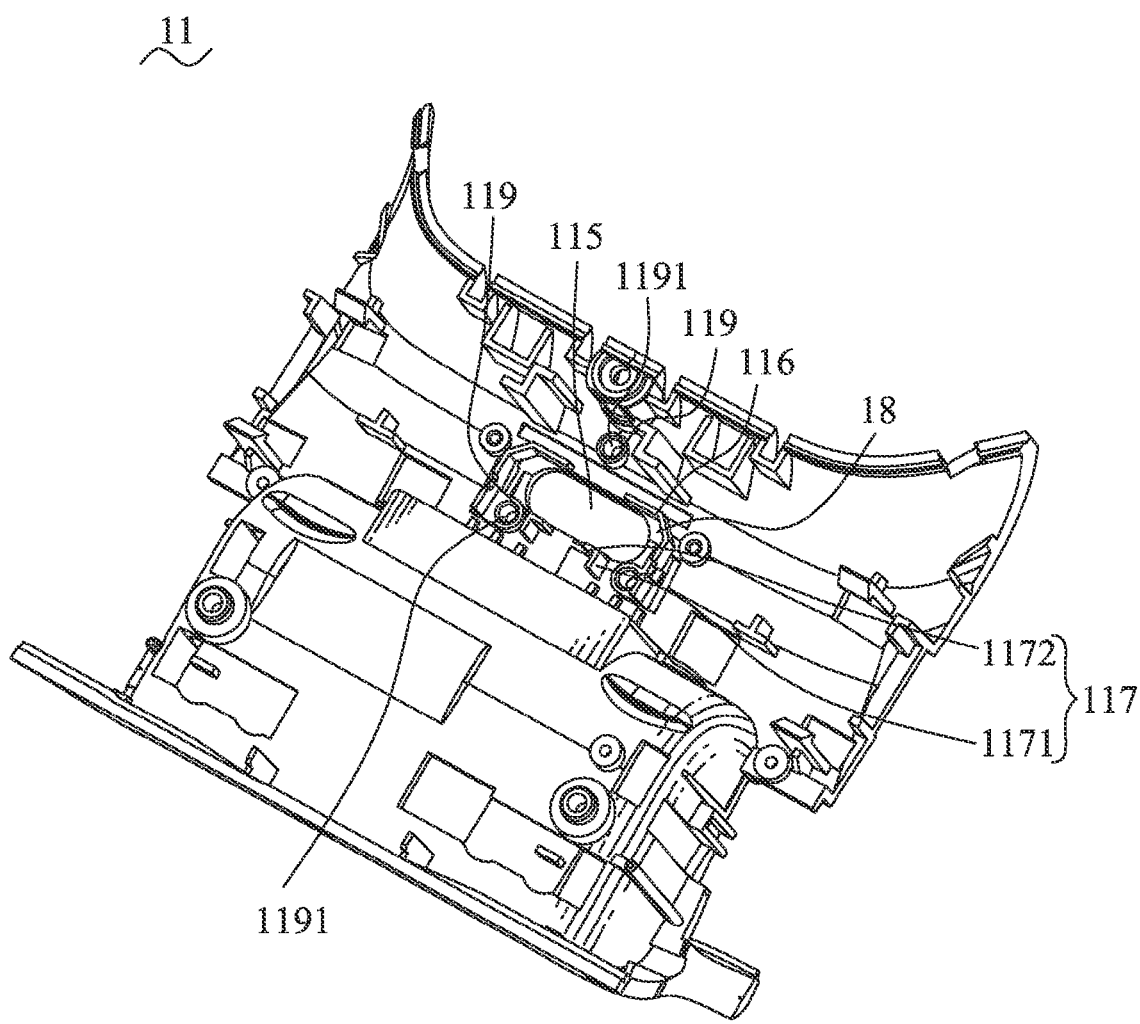
FIG. 7 is another perspective view of the first enclosure of the battery box structure of FIG. 3.
Figure 8:
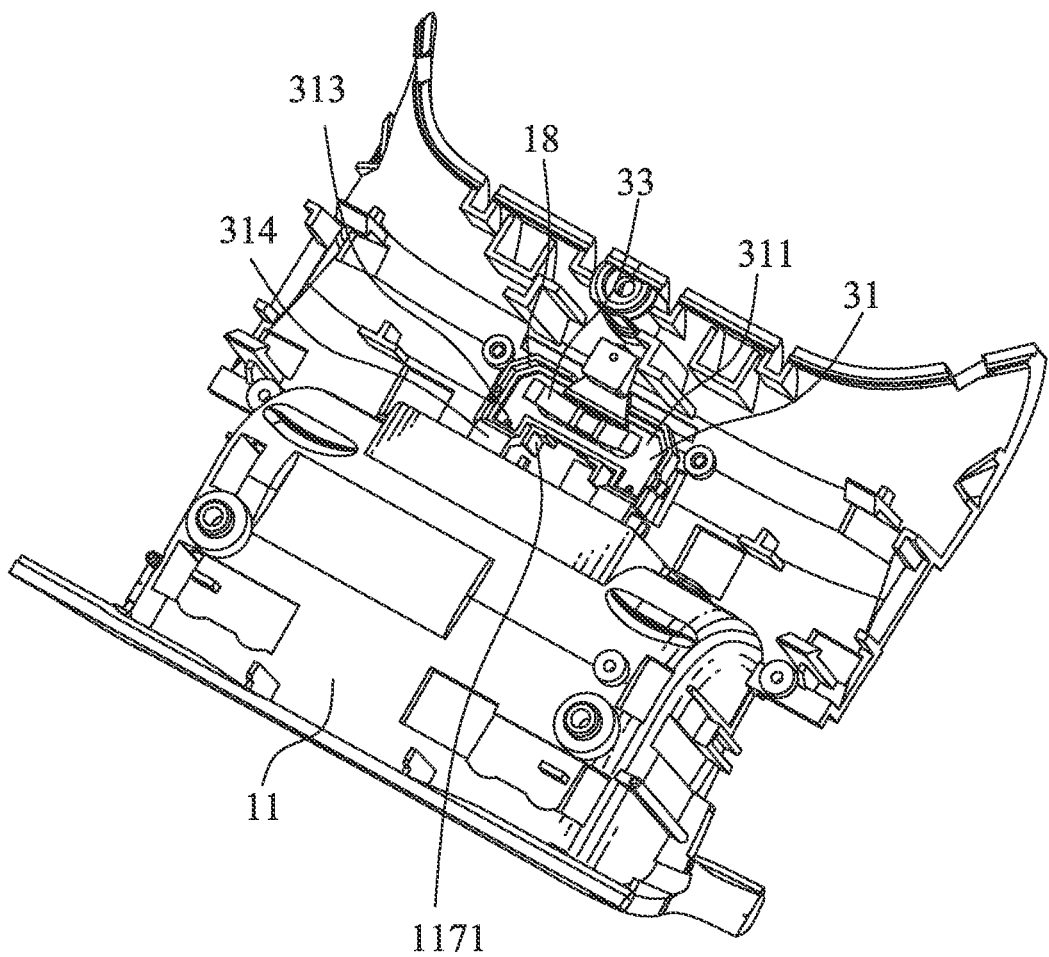
FIG. 8 is a perspective view of a pressing portion being assembled to the first enclosure of the battery box structure of FIG. 3.

Referring to FIG. 3, FIG. 6 and FIG. 7, the enclosure 10 defines a first receiving groove 111 which penetrates through a bottom surface and a lower portion of a front surface of the enclosure 10. Specifically, the enclosure 10 includes a first enclosure 11 and a second enclosure 12. The first enclosure 11 defines the first receiving groove 111 which penetrates through a bottom surface and a lower portion of a front surface of the first enclosure 11. A top sidewall of the first receiving groove 111 is recessed inward to form a first lacking groove 112. A top sidewall of the first lacking groove 112 opens an opening 113. Each lateral sidewall of the first receiving groove 111 protrudes transversely to form at least one guiding rib 114. The guiding rib 114 extends vertically and projects into the first receiving groove 111. The guiding rib 114 of one lateral sidewall of the first receiving groove 111 is parallel to the guiding rib 114 of the other lateral sidewall of the first receiving groove 111. In this embodiment, two portions of each lateral sidewall of the first receiving groove 111 protrude transversely to from two guiding ribs 114 spaced from each other. The two guiding ribs 114 are aligned with each other.

Referring to FIG. 6 and FIG. 7, the first enclosure 11 defines a first through-hole 115 located above the first receiving groove 111. A rear surface of the first enclosure 11 protrudes rearward to form an inverted U-shaped first fastening portion 116 which is located around a top and two opposite sides of the first through-hole 115. Two portions of the rear surface of the first enclosure 11 protrude rearward to form two second fastening portions 117 which is located under the first through-hole 115 and transversely spaced from each other. The two second fastening portions 117 are located between two opposite sides of the first fastening portion 116. Each of the two second fastening portions 117 has a longitudinal section 1171, and a transverse section 1172 perpendicularly connected to the longitudinal section 1171. The two longitudinal sections 1171 of the two second fastening portions 117 are parallel to and face to each other. The two longitudinal sections 1171 of the two second fastening portions 117 are spaced from each other. The two transverse sections 1172 of the two second fastening portions 117 are extended towards each other and are spaced from each other.

Referring to FIG. 3, FIG. 6 and FIG. 7, the first fastening portion 116 and the two second fastening portions 117 surround a second receiving groove 18 thereamong. Several portions of the rear surface of the first enclosure 11 protrude rearward to form a plurality of protruding pillars 119. One of the protruding pillars 119 is located above the first fastening portion 116. The other two protruding pillars 119 are respectively located at two opposite sides of the two second fastening portions 117 facing to the two opposite sides of the first fastening portion 116, and are located between the two opposite sides of the first fastening portion 116. Each of the protruding pillars 119 defines a guiding hole 1191 transversely penetrating therethrough. The second enclosure 12 opens a second through-hole 121 corresponding to the first through-hole 115.

Figure 9:
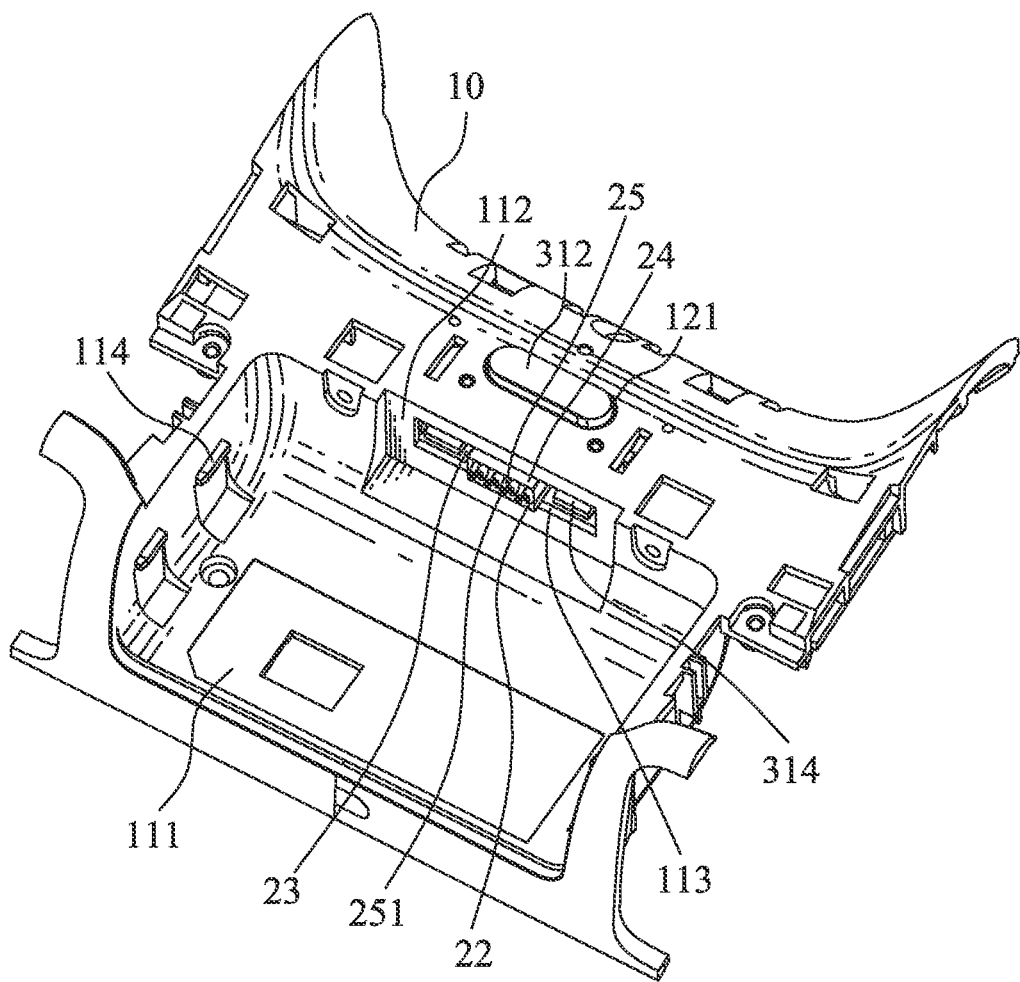
FIG. 9 is a perspective view of the battery box structure of FIG. 1, wherein the battery holder and a second enclosure is removed.

Referring to FIG. 3 and FIG. 9, the first circuit board 20 is disposed vertically. The first circuit board 20 defines a recess 21 penetrating through a middle of a bottom face of the first circuit board 20. A middle of a top sidewall of the recess 21 protrudes downward to form a protruding board 22 projecting beyond the bottom face of the first circuit board 20. The recess 21 is divided into two notches 23 by the protruding board 22. The battery box structure 100 further includes a rectangular insulating housing 24 mounted to a front of a bottom end of the protruding board 22 of the first circuit board 20, and at least one pair of conductive terminals 25 fastened to the insulating housing 24 and the protruding board 22 of the first circuit board 20. In this embodiment, the battery box structure 100 includes two pairs of conductive terminals 25. A tail end of each of the conductive terminals 25 is arched downward to form a resilient contact portion 251. The resilient contact portion 251 of each of the conductive terminals 25 is transversely arranged, and projects under a bottom surface of the insulating housing 24 and the bottom face of the first circuit board 20.

Figure 5:
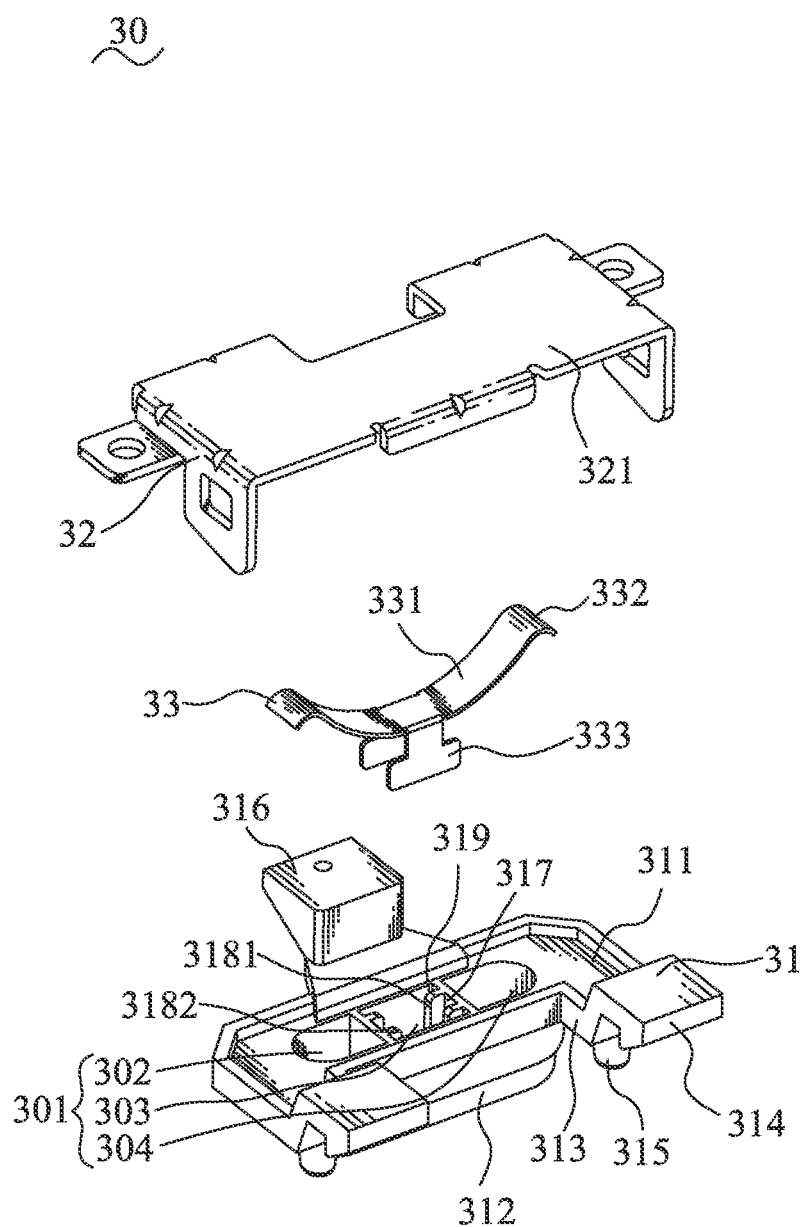
FIG. 5 is an exploded view of a push button of the battery box structure of FIG. 3.

Referring to FIG. 3 and FIG. 5, the push button 30 includes a pressing portion 31, a fixing element 32 and an elastic element 33. The pressing portion 31 has a cover-shaped base portion 311. A middle of a front surface of the base portion 311 of the pressing portion 31 protrudes forward to form a pressing cap 312. The pressing cap 312 defines an assembling groove 301 which passes through a rear of the pressing cap 312. The assembling groove 301 is transversely divided into three sections by two spaced isolating boards 317 which are connected between a top sidewall and a bottom sidewall of the assembling groove 301. The three sections of the assembling groove 301 are a first section 302, a third section 304, and a second section 303 located between the first section 302 and the third section 304.

Referring to FIG. 3 and FIG. 5, two upper portions of two facing surfaces of the two isolating boards 317 protrude face to face to form two upper protruding ribs 3181 projecting into the second section 303 of the assembling groove 301, and two lower portions of the two facing surfaces of the two isolating boards 317 protrude face to face to form two lower protruding ribs 3182 projecting into the second section 303 of the assembling groove 301. The upper protruding ribs 3181 are spaced from the lower protruding ribs 3182. The two upper protruding ribs 3181 are spaced from each other, and the two lower protruding ribs 3182 are spaced from each other. The two upper protruding ribs 3181 are adjacent to and spaced from a middle of the top sidewall of the assembling groove 301 to form one clamping groove 319 between the two upper protruding ribs 3181 and the middle of the top sidewall of the assembling groove 301. The two lower protruding ribs 3182 are adjacent to and spaced from a middle of the bottom sidewall of the assembling groove 301 to form the other clamping groove 319 between the two lower protruding ribs 3182 and the middle of the bottom sidewall of the assembling groove 301.

Referring to FIG. 3 and FIG. 5, two opposite sides of a bottom surface of the base portion 311 of the pressing portion 31 protrude downward to form two extending boards 313. A bottom end of each of the two extending boards 313 is connected with a hook-shaped buckling portion 314. The hook-shaped buckling portion 314 is extended rearward, then extended downward and further extended forward from the bottom end of the extending board 313. A top surface of the base portion 311 of the pressing portion 31 is connected with an assembling board 316. The push button 30 defines a plurality of guiding pillars 315. One of the guiding pillars 315 is protruded forward from a front surface of the assembling board 316, and the other two guiding pillars 315 are protruded forward from two front surfaces of the two extending boards 313 of the pressing portion 31. The fixing element 32 is made of metal. The fixing element 32 has a rectangular restricting plate 321 disposed vertically. The elastic element 33 has an elastic portion 331 of which a middle is arched forward. Two opposite sides of the elastic portion 331 are arched rearward to form two abutting portions 332. A top edge and a bottom edge of the middle of the elastic portion 331 are perpendicularly bent forward to form two clamping pieces 333.

Referring to FIG. 2, FIG. 3, FIG. 4 and FIG. 10, the battery holder 40 defines a holding groove 401 which penetrates through a rear surface of the battery holder 40 for receiving at least one battery 200. The battery 200 is placed in the holding groove 401 of the battery holder 40. The battery holder 40 includes at least one pair of plate-shaped conductive pads 431 fastened to a top of the battery holder 40 for being electrically connected with an anode and a cathode of the battery 200, respectively. The battery holder 40 has a base body 41, and a protruding block 42 protruded upward from a middle of a top of the base body 41. The base body 41 defines the holding groove 401 penetrating through a rear surface thereof. The protruding block 42 opens a locating groove 421 vertically penetrating through a middle of a top of the protruding block 42. The battery box structure 100 further includes a second circuit board 43. The conductive pads 431 are mounted on the second circuit board 43 and are transversely arranged. The second circuit board 43 is located in the locating groove 421 with the conductive pads 431 being exposed outside.

Figure 2:
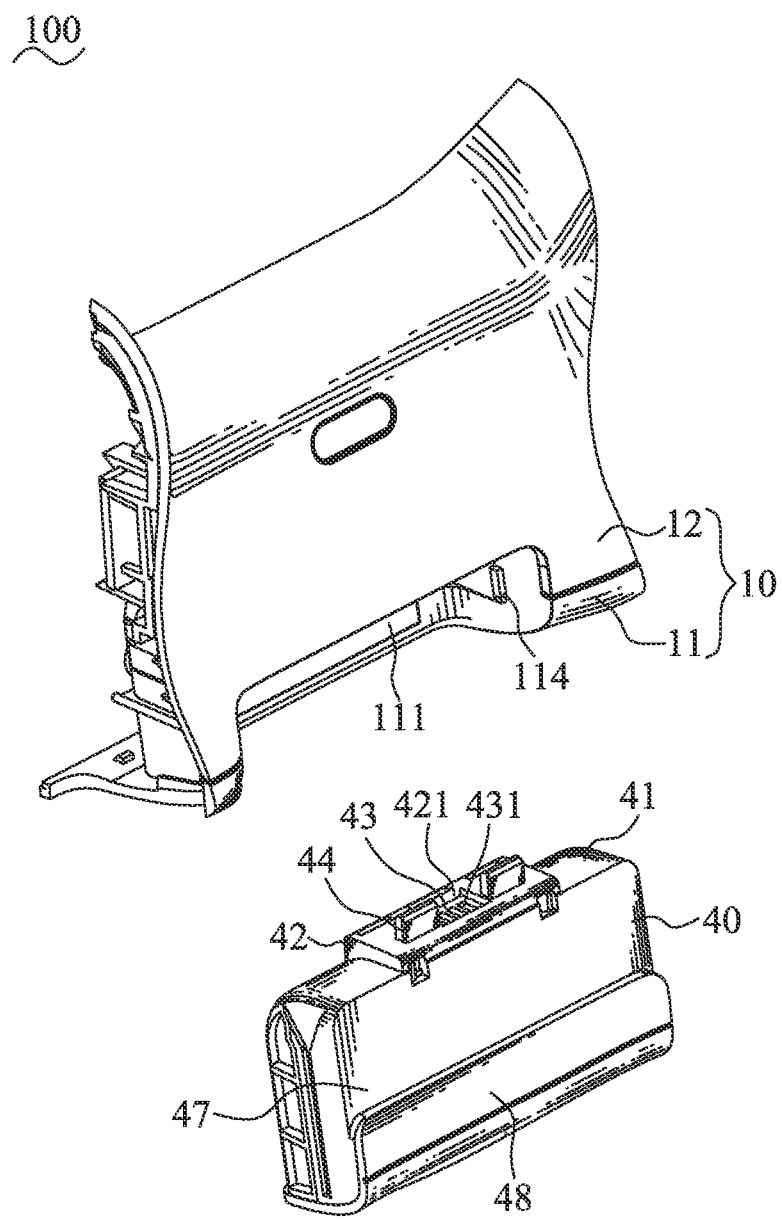
FIG. 2 is a perspective view of the battery box structure of FIG. 1, wherein a battery holder is disassembled from the battery box structure.

Referring to FIG. 2, FIG. 3, FIG. 4 and FIG. 10 again, in this embodiment, two batteries 200 are placed in the holding groove 401 of the battery holder 40. The battery holder 40 includes two pairs of plate-shaped conductive pads 431 fastened to the top of the battery holder 40. Each pair of conductive pads 431 are electrically connected with the anode and the cathode of each of the batteries 200, respectively, by virtue of the second circuit board 43 and a wire (not shown). Two opposite sides of the top of the protruding block 42 protrude upward to form two fastening boards 44. A rear surface of each of the fastening boards 44 is recessed inward to form a buckling groove 441. A middle of each side surface of the battery holder 40 defines a guiding slot 45 extending vertically. The guiding slot 45 defined in the middle of one side surface of the battery holder 40 is parallel to the guiding slot 45 defined in the middle of the other side surface of the battery holder 40. Two top ends of two sidewalls of each guiding slot 45 are spread outward to form a guiding gap 46. A top of a front surface of the battery holder 40 is recessed inward to form a second lacking groove 47. A bottom of the front surface of the battery holder 40 is defined as a cover portion 48.

Referring to FIG. 1 to FIG. 3, when the battery box structure 100 is assembled, the first circuit board 20 is mounted inside the first enclosure 11 of the enclosure 10 and is located above the first receiving groove 111. The push button 30 is elastically disposed between the enclosure 10 and the first circuit board 20. The push button 30 is disposed to a top end of the rear surface of the first enclosure 11 of the enclosure 10. The second enclosure 12 is fastened to a front of the first enclosure 11 and covers up a top of the first receiving groove 111, so the first receiving groove 111 is partially exposed out of the second enclosure 12. The push button 30 is partially exposed outside the enclosure 10 from the first through-hole 115 of the first enclosure 11 and the second through-hole 121 of the second enclosure 12.

Referring to FIG. 3, FIG. 5, FIG. 6, FIG. 7, FIG. 8 and FIG. 9, the pressing portion 31 of the push button 30 is slidably disposed to the top end of the rear surface of the first enclosure 11 of the enclosure 10. Specifically, the base portion 311 of the pressing portion 31 is slidably assembled to the second receiving groove 18 of the first enclosure 11. Each of the guiding pillars 315 is guided in the guiding hole 1191. The base portion 311 of the pressing portion 31 is capable of sliding forward and rearward under the guidance of the guiding pillars 315 and the guiding holes 1191. The pressing cap 312 of the push button 30 is received in the first through-hole 115 of the first enclosure 11 and the second through-hole 121 of the second enclosure 12, and is partially exposed to an outside of the second enclosure 12. Each extending board 313 is located between the first fastening portion 116 and the longitudinal section 1171 of the fastening portion 117.

Referring to FIG. 3, FIG. 5, FIG. 6, FIG. 7, FIG. 8 and FIG. 9, the elastic element 33 of the push button 30 is disposed to a rear of the pressing portion 31. The middle of the elastic portion 331 projects into the second section 303 of the assembling groove 301. The two clamping pieces 333 are respectively clamped in the two clamping grooves 319. The fixing element 32 is mounted to the rear surface of the first enclosure 11. The restricting plate 321 of the fixing element 32 is disposed behind the pressing portion 31 and the elastic element 33. The fixing element 32 abuts against the first fastening portion 116 and the two second fastening portions 117. The two abutting portions 332 respectively abut against two opposite sides of the restricting plate 321 of the fixing element 32. So, the base portion 311 of the pressing portion 31 is slidably restricted between the first enclosure 11 and the fixing element 32, and the elastic element 33 is elastically restricted between the pressing portion 31 and the fixing element 32.

Figure 10:
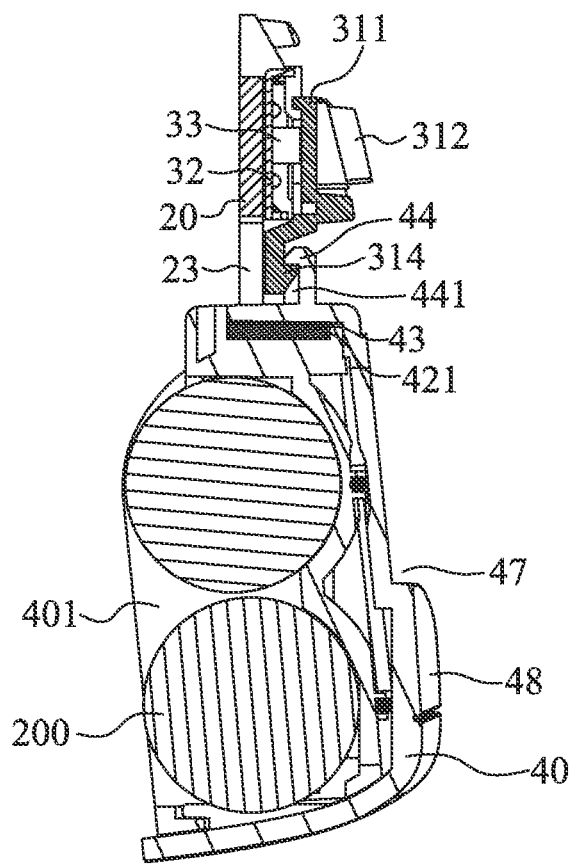
FIG. 10 is a sectional view of the battery box structure of FIG. 1, wherein the push button is buckled with the battery holder.
Figure 11:
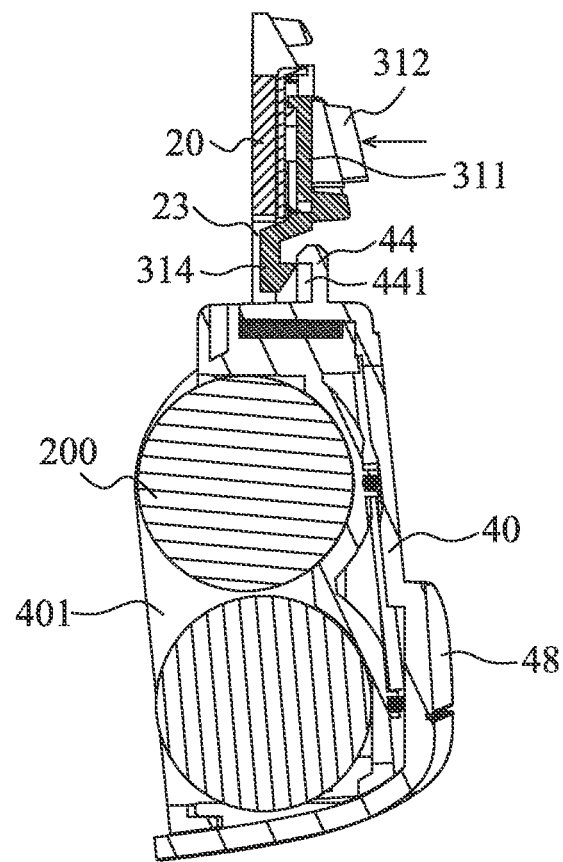
FIG. 11 is a sectional view of the battery box structure of FIG. 1, wherein the push button is without being buckled with the battery holder at the status of the push button being pressed rearward.
Figure 12:
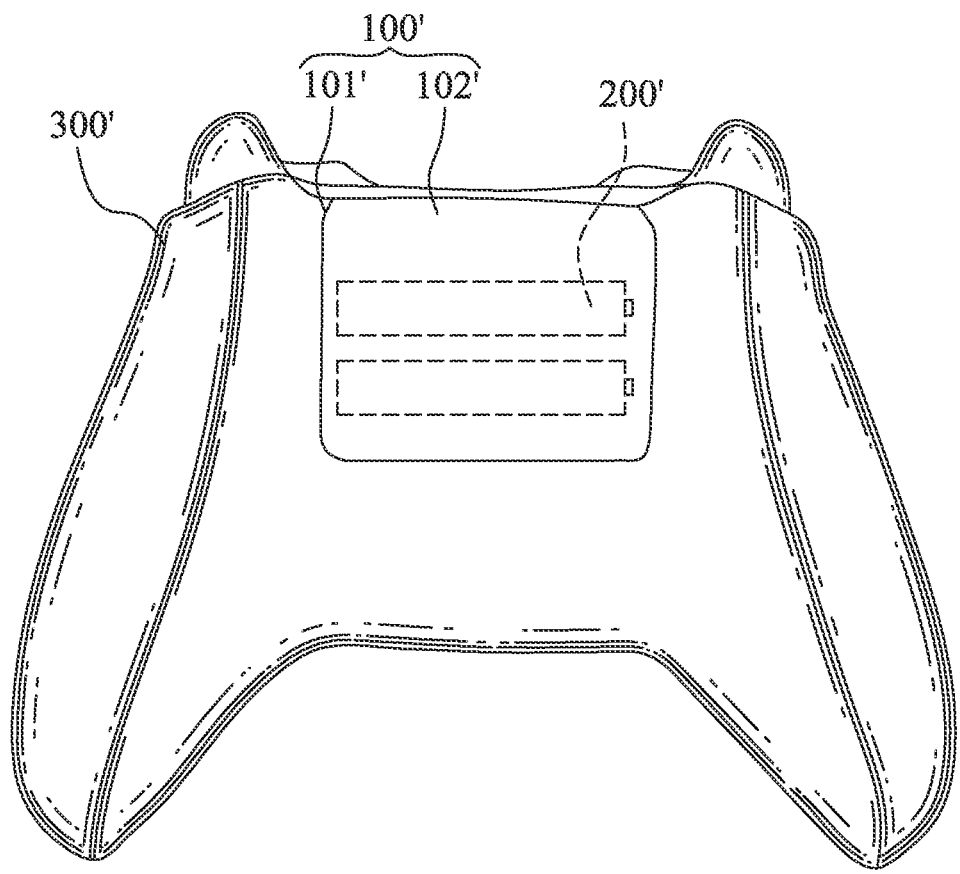
FIG. 12 is a schematic diagram of an electronic product in prior art, wherein at least one battery is placed in a battery box structure of the electronic product.

Referring to FIG. 3 and FIG. 10, the first circuit board 20 is located at a rear of the fixing element 32. The bottom end of the protruding board 22 together with the resilient contact portion 251 of each of the conductive terminals 25 projects into the first receiving groove 111 through the opening 113. Each buckling portion 314 of the pressing portion 31 is located in front of the first circuit board 20 and is corresponding to one of the notches 23 of the first circuit board 20.

Referring to FIG. 1 to FIG. 11, the battery 200 is placed in the holding groove 401 of the battery holder 40, and then the battery holder 40 together with the battery 200 is assembled upward in the first receiving groove 111 of the enclosure 10. Each guiding rib 114 of the first enclosure 11 is guided in the corresponding guiding slot 45 through the guiding gap 46 to make the battery holder 40 move upward in the first receiving groove 111 until a bottom sidewall of the second lacking groove 47 abuts against a bottom surface of the second enclosure 12. The protruding block 42 is received in the first lacking groove 112 of the first enclosure 11. A bottom end of the push button 30 is buckled with a top end of the battery holder 40. Specifically, each of the two fastening boards 44 passes through the opening 113 to be located in front of the corresponding buckling portion 314. Each buckling portion 314 of the push button 30 is buckled in the corresponding buckling groove 441 of the battery holder 40. Simultaneously, each of the conductive pads 431 of the battery holder 40 is corresponding to and electrically contacts the resilient contact portion 251 of one of the conductive terminals 25. The resilient contact portion 251 of each of the conductive terminals 25 is compressed to be deformed to accumulate elastic force. The cover portion 48 of the battery holder 40 is exposed out of the first receiving groove 111, and an area of the cover portion 48 of the battery holder 40 exposed out of the first receiving groove 111 is smaller.

Referring to FIG. 1 to FIG. 11, when the battery holder 40 need be ejected out of the first enclosure 11 of the enclosure 10 or when the battery 200 placed in the holding groove 401 of the battery holder 40 need be replaced, the pressing cap 312 of the push button 30 need be pressed rearward. When the pressing cap 312 of the push button 30 is pressed rearward to make the base portion 311 of the pressing portion 31 slide rearward so as to press against the elastic portion 331 of the elastic element 33, the elastic portion 331 of the elastic element 33 accumulates elastic force. Simultaneously, each buckling portion 314 of the pressing portion 31 is moved rearward to project into one of the notches 23 of the first circuit board 20. The bottom end of the pressing portion 31 breaks away from the top end of the battery holder 40. Each buckling portion 314 of the push button 30 breaks away from the corresponding buckling groove 441 of the battery holder 40. So the push button 30 is without being buckled with the battery holder 40. The resilient contact portions 251 of the conductive terminals 25 release the elastic force to push against the conductive pads 431 of the battery holder 40 to make the battery holder 40 move downward for a distance under the guidance of the guiding ribs 114 of the first enclosure 11 and the corresponding guiding slots 45, so that the battery holder 40 of the battery box structure 100 is automatically ejected out of the first enclosure 11 of the enclosure 10. The battery holder 40 is taken down directly to replace the battery 200 placed in the battery holder 40 of the battery box structure 100, so that the process of replacing the battery 200 placed in the battery box structure 100 of the electronic product need spend less time.

Referring to FIG. 1 to FIG. 11, the transverse section 1172 of the second fastening portion 117 restricts the base portion 311 of the pressing portion 31 from moving downward for preventing the pressing portion 31 being brought along by the fastening boards 44 to move downward at the time of the fastening boards 44 moving downward. The battery holder 40 is taken down, the battery 200 is able to be replaced. Loosen the pressing cap 312 of the push button 30, the elastic portion 331 of the elastic element 33 releases the elastic force to push against the pressing portion 31 to restore to a position where the pressing portion 31 is located before the pressing portion 31 is pressed rearward.

As described above, when the battery 200 placed in the holding groove 401 of the battery holder 40 need be replaced, the push button 30 is pressed rearward to accumulate elastic force, and the bottom end of the pressing portion 31 breaks away from the top end of the battery holder 40, the resilient contact portions 251 of the conductive terminals 25 release the elastic force to push against the conductive pads 431 of the battery holder 40 to make the battery holder 40 move downward for a distance, so that the battery holder 40 is automatically ejected out of the first enclosure 11 of the enclosure 10. As a result, the battery holder 40 is taken down directly to replace the battery 200 placed in the battery holder 40 of the battery box structure 100, so that the process of replacing the battery 200 placed in the battery box structure 100 of the electronic product need spend less time. Moreover, the second enclosure 12 of the enclosure 10 is fastened to the front of the first enclosure 11 of the enclosure 10 and covers up the top of the first receiving groove 111, so the first receiving groove 111 is partially exposed out of the second enclosure 12 to make the area of the cover portion 48 of the battery holder 40 exposed out of the first receiving groove 111 be smaller so as to satisfy an appearance requirement of the electronic product. Thus, the battery box structure 100 is for the convenience of replacing the battery 200 therein.

What is claimed is:

1. A battery box structure for receiving at least one battery therein, comprising:

an enclosure defining a first receiving groove which penetrates through a bottom surface and a lower portion of a front surface of the enclosure;

a first circuit board mounted inside the enclosure and located above the first receiving groove, at least one pair of conductive terminals being fastened to the first circuit board, a tail end of each of the conductive terminals being arched downward to form a resilient contact portion projecting into the first receiving groove;

a push button elastically disposed between the enclosure and the first circuit board, the push button being partially exposed outside the enclosure; and a battery holder defining a holding groove which penetrates through a rear surface of the battery holder, the battery holder including at least one pair of conductive pads fastened to a top of the battery holder, the battery being placed in the holding groove of the battery holder, a bottom end of the push button being buckled with a top end of the battery holder, the battery holder together with the battery being assembled upward in the first receiving groove of the enclosure, each of the conductive pads being corresponding to and electrically contacting the resilient contact portion of one of the conductive terminals, the resilient contact portion of each of the conductive terminals being compressed to accumulate elastic force, the conductive pads being electrically connected with an anode and a cathode of the battery, respectively, wherein when the push button is pressed rearward, the bottom end of the push button breaks away from the top end of the battery holder, the resilient contact portions of the conductive terminals release the elastic force to push against the conductive pads of the battery holder to make the battery holder move downward for a distance, so that the battery holder is automatically ejected out of the enclosure, wherein the enclosure includes a first enclosure and a second enclosure, the first enclosure defines the first receiving groove which penetrates through a bottom surface and a lower portion of a front surface of the first enclosure, the second enclosure is fastened to a front of the first enclosure and covers up a top of the first receiving groove, wherein a top sidewall of the first receiving groove is recessed inward to form a first locking groove, the battery holder has a base body, and a protruding block protruded upward from a top of the base body, the protruding block is received in the first locking groove, and wherein a top sidewall of the first locking groove opens an opening, the first circuit board is mounted inside the first enclosure, and is located above the first receiving groove, the first circuit board defines a recess penetrating through a bottom face of the first circuit board, a top sidewall of the recess protrudes downward to form a protruding board projecting beyond the bottom face of the first circuit board, the recess is divided into two notches by the protruding board, a bottom end of the protruding board projects into the first receiving groove through the opening, the push button includes a pressing portion which has a base portion, two opposite sides of a bottom surface of the base portion protrude downward to form two extending boards, a bottom end of each of the two extending boards is connected with a hook-shaped buckling portion, each buckling portion is located in front of the first circuit board and is corresponding to one of the notches.

2. The battery box structure as claimed in claim 1, further comprising an insulating housing mounted to a front of the bottom end of the protruding board of the first circuit board, and the conductive terminals fastened to the insulating housing and the protruding board, the resilient contact portion of each of the conductive terminals being transversely arranged, and projecting under a bottom surface of the insulating housing and the bottom face of the first circuit board.

3. The battery box structure as claimed in claim 1, wherein two opposite sides of a top of the protruding block protrude upward to form two fastening boards, a rear surface of each of the fastening boards is recessed inward to form a buckling groove, each of the two fastening boards passes through the opening to be located in front of the corresponding buckling portion, each buckling portion is buckled in or breaks away from the corresponding buckling groove.

4. The battery box structure as claimed in claim 1, further comprising a second circuit board, the conductive pads being mounted on the second circuit board, the protruding block opening a locating groove vertically penetrating through a middle of a top of the protruding block, the second circuit board being located in the locating groove with the conductive pads being exposed outside, the conductive pads being electrically connected with the anode and the cathode of the battery, respectively, by virtue of the second circuit board.

5. The battery box structure as claimed in claim 1, wherein the push button further includes a fixing element and an elastic element, the base portion of the pressing portion is slidably restricted between the first enclosure and the fixing element, and the elastic element is elastically restricted between the pressing portion and the fixing element.

6. The battery box structure as claimed in claim 5, wherein the first enclosure defines a first through-hole located above the first receiving groove, the second enclosure opens a second through-hole corresponding to the first through-hole, a front surface of the base portion of the pressing portion protrudes forward to form a pressing cap, the pressing cap of the push button is received in the first through-hole and the second through-hole, and is partially exposed to an outside of the second enclosure.

7. The battery box structure as claimed in claim 6, wherein the pressing cap defines an assembling groove which passes through a rear of the pressing cap, the assembling groove is transversely divided into three sections by two spaced isolating boards which are connected between a top sidewall and a bottom sidewall of the assembling groove, the three sections of the assembling groove are a first section, a third section, and a second section located between the first section and the third section, the elastic element has an elastic portion of which a middle is arched forward, the elastic element is disposed to a rear of the pressing portion, the middle of the elastic portion projects into the second section of the assembling groove.

8. The battery box structure as claimed in claim 7, wherein two upper portions of two facing surfaces of the two isolating boards protrude face to face to form two upper protruding ribs, and two lower portions of the two facing surfaces of the two isolating boards protrude face to face to form two lower protruding ribs, the two upper protruding ribs are adjacent to and spaced from a middle of the top sidewall of the assembling groove to form one clamping groove between the two upper protruding ribs and the middle of the top sidewall of the assembling groove, the two lower protruding ribs are adjacent to and spaced from a middle of the bottom sidewall of the assembling groove to form the other clamping groove between the two lower protruding ribs and the middle of the bottom sidewall of the assembling groove, a top edge and a bottom edge of the middle of the elastic portion are perpendicularly bent forward to form two clamping pieces, the two clamping pieces are respectively clamped in the two clamping grooves.

9. The battery box structure as claimed in claim 7, wherein the fixing element is mounted to a rear surface of the first enclosure, two opposite sides of the elastic portion are arched rearward to form two abutting portions, the fixing element has a restricting plate which is disposed behind the pressing portion and the elastic element, the two abutting portions respectively abut against two opposite sides of the restricting plate of the fixing element.

10. The battery box structure as claimed in claim 7, wherein a rear surface of the first enclosure protrudes rearward to form an inverted U-shaped first fastening portion located around a top and two opposite sides of the first through-hole, two portions of the rear surface of the first enclosure protrude rearward to form two second fastening portions located under the first through-hole and transversely spaced from each other, the first fastening portion and the two second fastening portions surround a second receiving groove thereamong, the fixing element abuts against the first fastening portion and the two second fastening portions, the base portion of the pressing portion is slidably assembled to the second receiving groove.

11. The battery box structure as claimed in claim 10, wherein a top surface of the base portion of the pressing portion is connected with an assembling board, the push button defines a plurality of guiding pillars, one of the guiding pillars is protruded forward from a front surface of the assembling board, and the other two guiding pillars are protruded forward from two front surfaces of the two extending boards of the pressing portion, several portions of the rear surface of the first enclosure protrude rearward to form a plurality of protruding pillars, one of the protruding pillars is located above the first fastening portion, and the other two protruding pillars are respectively located at two opposite sides of the two second fastening portions facing to two opposite sides of the first fastening portion, and located between the two opposite sides of the first fastening portion, each of the protruding pillars defines a guiding hole transversely penetrating therethrough, each of the guiding pillars is guided in the guiding hole.

12. The battery box structure as claimed in claim 1, wherein each lateral sidewall of the first receiving groove protrudes transversely to form at least one guiding rib, the guiding rib extends vertically and projects into the first receiving groove, the guiding rib of one lateral sidewall of the first receiving groove is parallel to the guiding rib of the other lateral sidewall of the first receiving groove, a middle of each side surface of the battery holder defines a guiding slot extending vertically, the resilient contact portion of each of the conductive terminals releases the elastic force to push against the conductive pads of the battery holder to make the battery holder move downward for a distance under the guidance of the guiding rib of each lateral sidewall of the first receiving groove and the corresponding guiding slot.

* * * * *